United States Patent
Kyeong et al.

(10) Patent No.: US 10,658,104 B2
(45) Date of Patent: May 19, 2020

(54) MAGNETIC SHEET AND WIRELESS POWER CHARGING APPARATUS INCLUDING THE SAME

(71) Applicant: WITS Co., Ltd., Yongin-si, Gyeonggi-do (KR)

(72) Inventors: San Kyeong, Suwon-si (KR); Doo Ho Park, Suwon-si (KR); Jung Young Cho, Suwon-si (KR); Chang Hak Choi, Suwon-si (KR)

(73) Assignee: WITS Co., Ltd., Gyeonggi-do (KR)

(*) Notice: Subject to any disclaimer, the term of this patent is extended or adjusted under 35 U.S.C. 154(b) by 274 days.

(21) Appl. No.: 15/794,678

(22) Filed: Oct. 26, 2017

(65) Prior Publication Data

US 2018/0286575 A1    Oct. 4, 2018

(30) Foreign Application Priority Data

Apr. 3, 2017 (KR) .................. 10-2017-0043150

(51) Int. Cl.
| | |
|---|---|
| H02J 7/00 | (2006.01) |
| H02J 50/10 | (2016.01) |
| H02J 50/70 | (2016.01) |
| H01F 27/00 | (2006.01) |
| H01F 38/14 | (2006.01) |
| H01F 27/36 | (2006.01) |
| H02J 7/02 | (2016.01) |
| H01F 27/34 | (2006.01) |

(52) U.S. Cl.
CPC ........... *H01F 27/365* (2013.01); *H01F 38/14* (2013.01); *H02J 7/025* (2013.01); *H02J 50/10* (2016.02); *H02J 50/70* (2016.02); *H01F 2027/348* (2013.01)

(58) Field of Classification Search
CPC .......... H01F 27/365; H02J 50/10; H02J 7/025
USPC ....................................................... 320/108
See application file for complete search history.

(56) References Cited

U.S. PATENT DOCUMENTS

| | | | | |
|---|---|---|---|---|
| 6,136,458 | A * | 10/2000 | Inoue .................. | H01F 17/0006 427/128 |
| 9,275,787 | B2 * | 3/2016 | Yan ........................ | H01F 17/04 |
| 2002/0118089 | A1 * | 8/2002 | Sakakura ............. | H01F 17/0033 336/200 |
| 2003/0080845 | A1 * | 5/2003 | Fontanelle .......... | H01F 17/0006 336/200 |

(Continued)

FOREIGN PATENT DOCUMENTS

| | | | | |
|---|---|---|---|---|
| JP | 2008192645 | A * | 8/2008 | ......... H01F 41/0273 |
| JP | 2012-199504 | A | 10/2012 | |

(Continued)

OTHER PUBLICATIONS

Misai et al. (Japanese Patent Document No. JP-2008-192645 A, published on Aug. 21, 2008, machine translated by Japan Patent Office website on Sep. 21, 2019, 60 pages). (Year: 2008).*

*Primary Examiner* — Phallaka Kik
(74) *Attorney, Agent, or Firm* — Harness, Dickey & Pierce, P.L.C.

(57) ABSTRACT

A magnetic sheet includes a first region and a second region disposed adjacent to each other on a same surface, wherein the first region includes first crack lines formed in a first direction, and the second region includes second crack lines formed in a second direction.

15 Claims, 6 Drawing Sheets

(56) References Cited

U.S. PATENT DOCUMENTS

| | | | |
|---|---|---|---|
| 2004/0173568 A1* | 9/2004 | Hattori | B82Y 10/00 216/22 |
| 2004/0259604 A1* | 12/2004 | Mickle | H02J 17/00 455/572 |
| 2007/0069961 A1* | 3/2007 | Akiho | H01Q 1/243 343/702 |
| 2009/0045899 A1* | 2/2009 | Masai | H01F 17/0006 336/172 |
| 2010/0279141 A1* | 11/2010 | Iwata | C21D 8/1294 428/600 |
| 2012/0060609 A1* | 3/2012 | Fukutomi | G01N 29/225 73/592 |
| 2013/0015718 A1* | 1/2013 | Jung | H04B 5/0037 307/104 |
| 2013/0092652 A1* | 4/2013 | Iwata | C21D 8/12 216/13 |
| 2013/0129984 A1* | 5/2013 | Omura | H01F 1/18 428/167 |
| 2013/0129985 A1* | 5/2013 | Inoue | C22C 38/001 428/167 |
| 2013/0160901 A1* | 6/2013 | Omura | C21D 8/12 148/537 |
| 2014/0374137 A1* | 12/2014 | Kwon | C21D 8/1288 174/126.3 |
| 2016/0043570 A1* | 2/2016 | Jeong | H01G 7/04 307/104 |
| 2016/0265940 A1* | 9/2016 | Burgdorf | B60T 8/171 |
| 2017/0133148 A1* | 5/2017 | Velez | H01L 28/00 |
| 2017/0263357 A1* | 9/2017 | Senda | B21B 3/02 |
| 2017/0298467 A1* | 10/2017 | Suehiro | C22C 38/00 |
| 2018/0036838 A1* | 2/2018 | Hamamura | C22C 38/00 |
| 2018/0071869 A1* | 3/2018 | Sakai | C21D 8/12 |
| 2018/0151284 A1* | 5/2018 | Sakai | H01F 17/04 |
| 2018/0177075 A1* | 6/2018 | Kweon | H01F 27/22 |
| 2019/0035524 A1* | 1/2019 | Kwon | H01F 1/16 |
| 2019/0048434 A1* | 2/2019 | Mizumura | C21D 8/12 |

FOREIGN PATENT DOCUMENTS

| | | |
|---|---|---|
| KR | 10-2015-0001416 A | 1/2015 |
| KR | 10-2015-0084213 A | 7/2015 |
| KR | 10-2018-0005967 A | 1/2018 |

* cited by examiner

MAGNETIC SHEET AND WIRELESS POWER CHARGING APPARATUS INCLUDING THE SAME

CROSS-REFERENCE TO RELATED APPLICATIONS

This application claims the benefit under 35 USC 119(a) of Korean Patent Application No. 10-2017-0043150 filed on Apr. 3, 2017 in the Korean Intellectual Property Office, the entire disclosure of which is incorporated herein by reference for all purposes.

BACKGROUND

1. Field

The following description relates to a magnetic sheet and a wireless power charging apparatus including the magnetic sheet.

2. Description of Related Art

Wireless transmission technologies such as wireless power charging (WPC), near field communications (NFC), and magnetic secure transmissions (MST) have recently been employed in portable electronic devices.

In such a wireless transmission technology, a magnetic sheet performs a function of shielding and collecting electromagnetic waves.

For example, the magnetic sheet is disposed on one side of a transmission and reception coil in a wireless power charging apparatus for wireless power charging (WPC), and the magnetic sheet shields and collects an electromagnetic field generated by the transmission and reception coil to significantly decrease an influence of the magnetic field on the electronic device and efficiently transmit the electromagnetic field radiated from a wireless power transmitter to a wireless power receiver.

Since a portable electronic device using such a magnetic sheet is both multifunctional and highly functional, performance of the magnetic sheet is required to be improved.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a magnetic sheet includes: a first region and a second region disposed adjacent to each other on a same surface, wherein the first region includes first crack lines formed in a first direction, and the second region includes second crack lines formed in a second direction.

The first region and the second region may be alternately disposed with respect to a center point of the surface.

The first direction may be a direction of a magnetic easy axis of the first region and the second direction may be a direction of the magnetic easy axis of the second region.

The first direction and the second direction may be perpendicular to each other.

The first crack lines and the second crack lines may form a pattern including concentric polygons having a center at the center point.

The first crack lines and the second crack lines may form a cross-shaped pattern.

Boundaries at which the first region and the second region are adjacent to each other may intersect at the center point.

The first crack lines and the second crack lines may be linearly crushed by a roller including protrusions.

In another general aspect, a wireless power charging apparatus includes: a wireless power charging coil; and a shielding sheet including stacked magnetic sheets disposed at a side of the coil, wherein the magnetic sheets each include a first region including crack lines formed in a first direction and a second region including second crack lines formed in a second direction, and wherein the first region and the second region are alternately disposed with respect to a center point of the respective magnetic sheet.

The first direction may be a direction of a magnetic easy axis of the first region and the second direction may be a direction of a magnetic easy axis of the second region.

The first direction and the second direction may be perpendicular to each other.

The first crack lines and the second crack lines may form a pattern including concentric polygons having a center at the center point.

The first crack lines and the second crack lines may form a cross-shaped pattern.

The boundaries at which the first region and the second region are adjacent to each other may intersect at the center point.

The first crack lines and the second crack lines may be linearly crushed by a roller including protrusions.

The coil may include a winding center disposed at a central portion of the magnetic sheet.

In another general aspect, a magnetic sheet includes: first linear depressions formed on a surface of the magnetic sheet, in first regions of the magnetic sheet, and extending in a magnetic easy axis direction of the first regions; and second linear depressions formed on the surface, in second regions of the magnetic sheet, and extending in a magnetic easy axis direction of the second regions, wherein the magnetic easy axis direction of the first regions is different than the magnetic easy axis direction of the second regions.

The magnetic easy axis direction of the first regions may be perpendicular to the magnetic easy axis direction of the second regions.

Each of the first regions may be disposed adjacent to each of the second regions.

The first linear depressions may intersect corresponding second linear depressions, among the second linear depressions, to form either one of a pattern including cross shapes and a pattern including concentric polygons.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, example embodiments will be described in detail with reference to the accompanying drawings.

Figure 1:
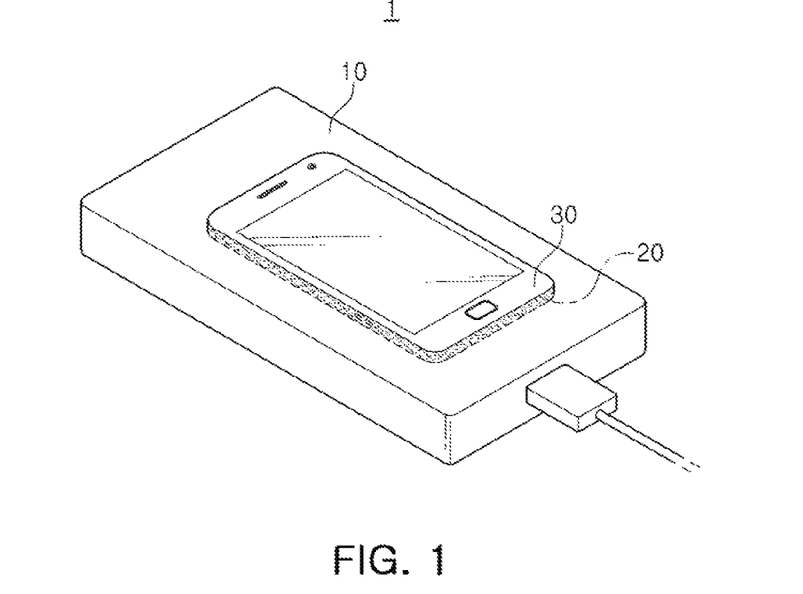
FIG. 1 is an exterior perspective view of a general wireless power charging system, according to an embodiment.
Figure 2:
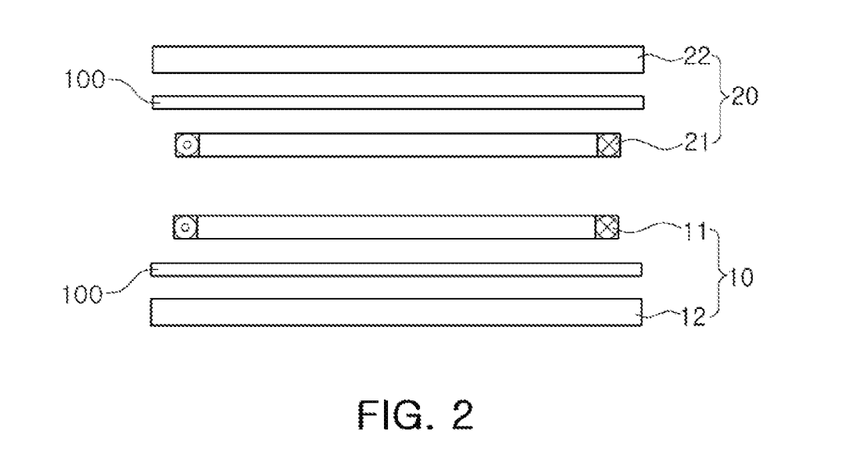
FIG. 2 is an exploded cross-sectional view illustrating internal components of the wireless charging system of FIG. 1.

FIG. 1 is an exterior perspective view of a wireless power charging system 1. FIG. 2 is an exploded cross-sectional view illustrating internal components of the wireless charging system 1.

Referring to FIGS. 1 and 2, the wireless power charging system includes a wireless power transmitter 10 and a wireless power receiver 20. The wireless power receiver 20 is included, for example, in an electronic device 30. The electronic device 30 is, for example, a cellular phone, a notebook, or a tablet PC. However, the electronic device 30 is not limited to the foregoing examples.

Referring to FIG. 2, a transmission coil 11 is formed on a substrate 12 in an interior of the wireless power transmitter 10. When an alternating current (AC) voltage is applied to the wireless power transmitter 10, a magnetic field is formed around the transmission coil 11. Accordingly, a reception coil 21 embedded in the wireless power receiver 20 charges a battery 22 by electromotive force induced from the transmission coil 11.

The battery 22 may be a rechargeable nickel-metal hydride battery or lithium-ion battery, but is not limited to such examples. In addition, the battery 22 may be formed to be physically separate from the wireless power receiver 20 and may be removable from the wireless power receiver 20, or the battery 22 and the wireless power receiver 20 may be integrally formed.

The transmission coil 11 and the reception coil 21 can be electromagnetically coupled to each other, and have a shape in which a conductive wire having a metal wire form or a conductive pattern formed on the substrate is wound. In this case, a winding shape of the transmission coil 11 and the reception coil 21 may be a circular shape, an oval shape, a quadrangular shape, or a rhombic shape, and sizes of the transmission coil 11 and the reception coil 21 and the number of windings may be appropriately set according to required properties.

A shielding sheet 100 is disposed at the reception side between the reception coil 21 and the battery 22. Another shielding sheet 100 is disposed at the transmission side between the transmission coil 11 and the substrate 12. The shielding sheet 100 disposed at the transmission side shields a magnetic flux formed at a central portion of the transmission coil 11. The shielding sheet 100 disposed at the reception side collects the magnetic flux, thereby allowing the magnetic flux to be efficiently received by the reception coil 21. Together with the above-mentioned function, the shielding sheet 100 at the reception side blocks at least a portion of the magnetic flux from reaching the battery 22. Hereinafter, in a case in which there is no need to particularly distinguish, both the wireless power transmitter 10 and the wireless power receiver 20 are referred to as a wireless power charging apparatus, and both the transmission coil 11 and the reception coil 21 are referred to as a coil.

As such, the shielding sheet 100 is applied to the coil of the wireless charging apparatus. In addition, the coil may be used as a wireless antenna in magnetic secure transmission (MST), near field communication (NFC), or other wireless transmissions, in addition to being used in the wireless charging apparatus, and the shielding sheet 100 may be applied to the wireless transmission antenna.

Figure 3:
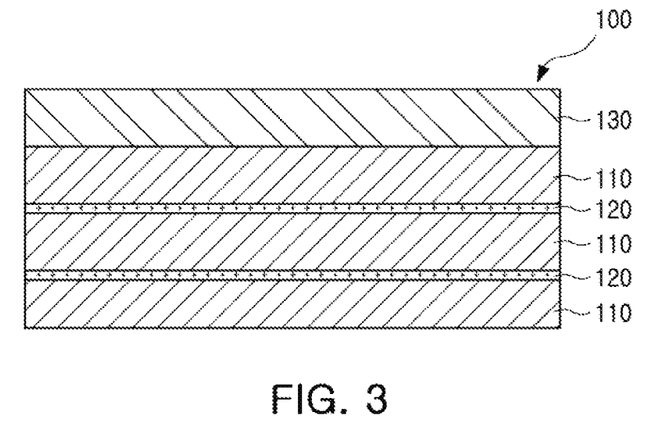
FIG. 3 is a cross-sectional view schematically illustrating a shielding sheet, according to an embodiment.

FIG. 3 is a cross-sectional view schematically illustrating the shielding sheet 100, according to an embodiment.

Referring to FIG. 3, the shielding sheet 100 includes magnetic sheets 110 which are stacked in a thickness direction of the shielding sheet 100, adhesive sheets 120, and a coating layer 130. Here, the number of the stacked magnetic sheets 110 may be appropriately adjusted according to an intended shielding and collecting function.

The magnetic sheet 110 is formed by pressurizing and molding a powder magnetic material, or sintering the power magnetic material after pressurizing the power magnetic material. The magnetic sheet 110 may be soft magnetic material, and a thin plate metal ribbon having an amorphous structure or a nanocrystalline structure may be used as the magnetic sheet 110. Alternatively, the magnetic sheet 110 may be formed of permalloy, which is a material having high permeability.

The thin plate metal ribbon having the amorphous structure may be formed of an Fe-based or Co-based magnetic alloy. The Fe-based magnetic alloy is, for example, an Fe—Si—B alloy. When a content of a metal including Fe is high, saturation magnetic flux density is increased, but when the content of Fe is excessive, it is difficult to form the amorphous structure. Therefore, the content of Fe may be 70 to 90 atomic %, and in terms of amorphous formability, a sum of Si and B may preferably be in the range of 10 to 30 atomic %. In order to prevent corrosion of such a basic composition, corrosion resistant elements such as Cr or Co, and the like may be added in an amount up to 20 atomic %, and a small amount of other metal elements may be included to provide other characteristics, as needed.

The metal ribbon having a nano-crystalline structure may be formed of an Fe-based nanocrystal grain magnetic alloy. In addition, an Fe—Si—B—Cu—Nb alloy may be used as the Fe-based nanocrystal grain alloy. Additionally, the amorphous metal ribbon may be heat-treated at an appropriate temperature to form the nanocrystal grain alloy.

Adjacent magnetic sheets 110 are attached to each other by the adhesive sheets 120. The adhesive sheets 120 may be an adhesive tape, and may also be formed by applying an adhesive or a resin having adhesive property to a surface of the respective magnetic sheet 110.

The coating layer 130 is provided to efficiently radiate heat generated by the magnetic sheet 110, and is formed to cover a top surface of the magnetic sheet 110. As illustrated in FIG. 3, a case in which the magnetic sheets 110 are stacked, the coating layer 130 is formed to cover the top surface of the magnetic sheet disposed 110 in the uppermost portion among the plurality of magnetic sheets 110. For example, the coating layer 130 includes a graphene power, as a material having excellent heat conductivity.

The magnetic sheet 110 includes crack lines (e.g., linear depressions or score lines) to reduce an eddy current and enhance a magnetic field. Specifically, the magnetic sheet 110 includes at least one first region and at least one second region disposed to be adjacent to each other on the same surface. In addition, the first region includes first crack lines formed in a first direction, and the second region adjacent to the first region includes second crack lines formed in a second direction.

Hereinafter, various embodiments of a magnetic sheet will be described in more detail with reference to FIGS. 4 through 7.

Although FIGS. 4 through 7 illustrate magnetic sheets 11, 112, 113, and 114 having a quadrangular shape, two first regions, and two second regions for convenience of explanation, the shape of the magnetic sheet may be a circular shape, an oval shape, or a rhombic shape, and the number of the first regions and the second regions may be adjusted. For example, in the example embodiments of FIGS. 4 through 7, when some of the two first regions and the two second regions are omitted, the magnetic sheets may include one first region and one second region. In addition, when the first region and the second region are subdivided, the magnetic sheet may include three or more first regions or three or more second regions.

Figure 4:
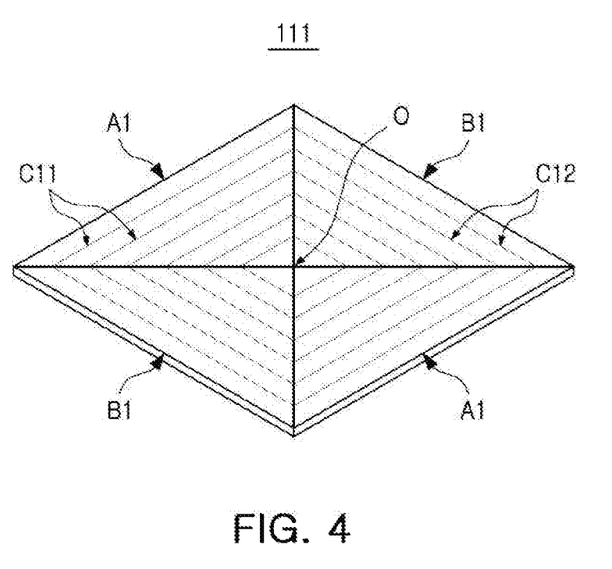
FIGS. 4 through 7 are perspective views illustrating magnetic sheets according to other embodiments.

Referring to FIG. 4, the magnetic sheet 111 includes two first regions A1 and two second regions B1. The two first regions A1 and the two second regions B1 are alternately disposed with respect to a center point O. By such an arrangement, the two first regions A1 may be symmetrical with each other with respect to the center point O, and the two second regions B1 may be symmetrical with each other with respect to the center point O.

In addition, the first region A1 and the second region B1 are adjacent to each other. That is, the first region A1 and the second region B1 are in contact with each other at the center point O, and sides of the first region A and sides of the second region B1 are in contact with each other to form a boundary between the first region A1 and the second region B1. As illustrated in FIG. 4, the boundaries at which the first regions A1 and the second regions B1 are adjacent to each other intersect at the center point O.

In addition, the first region A1 includes first crack lines C11 formed in a first direction, and the second region B1 adjacent to the first region A1 includes second crack lines C12 formed in a second direction. The first direction is a direction of a magnetic easy axis of the first region A1, and the second direction is a direction of a magnetic easy axis of the second region B1. The first direction and the second direction may be perpendicular to each other. However, the first direction and the second direction may form other angles, such that the first direction and the second direction are not perpendicular to each other.

Therefore, as illustrated in FIG. 4, the first crack lines C11 and the second crack lines C12 form a pattern in which polygons having the center point O as concentricity are arranged. That is, the first crack lines C11 and the second crack lines C12 form a pattern including concentric polygons having a center at the center point O. FIG. 4 illustrates a pattern in which the first crack lines C11 and the second crack lines C12 are connected at the boundary between the first region A1 and the second region B1, but such an example pattern is for convenience of explanation. The first crack lines C11 and the second crack lines C12 may form a pattern in which they are staggered at the boundary between the first region A1 and the second region B1.

Figure 5:
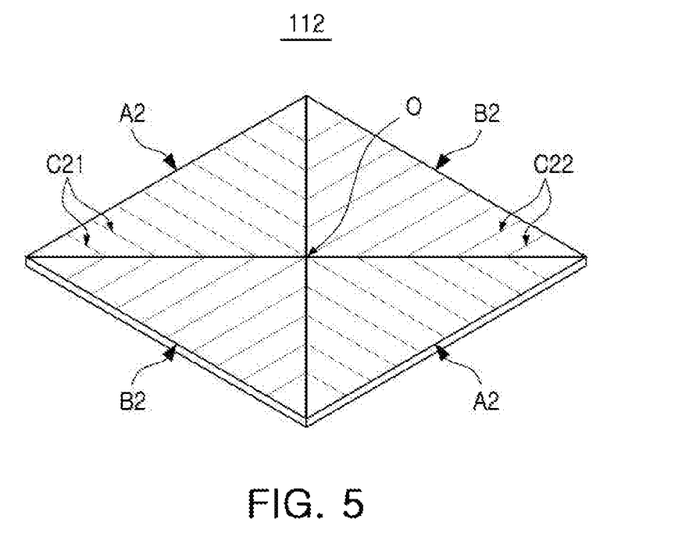

Referring to FIG. 5, the magnetic sheet 112 includes two first regions A2 and two second regions B2. The first region A2 includes first crack lines C21 formed in a first direction, and the second region B2 adjacent to the first region A2 includes second crack lines C22 formed in a second direction. However, the first direction and the second direction of the magnetic sheet 112 of FIG. 5 are different from those of the magnetic sheet 111 of FIG. 4.

That is, the first crack lines C21 and the second crack lines C22 extend to outer edges of the first region A2 and the second region B2, respectively, from the boundary between the first region A2 and the second region B2. As illustrated in FIG. 5, a pattern formed by the first crack lines C21 and the second crack lines C22 may be defined as a cross-shaped pattern.

Figure 6:
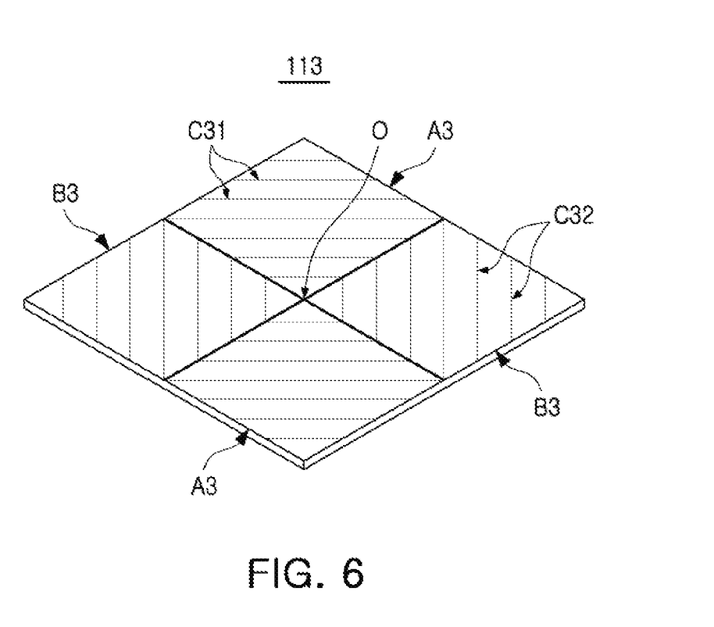

Referring to FIG. 6, the magnetic sheet 113 includes two first regions A3 and two second regions B3. The first region A3 includes first crack lines C31 formed in a first direction, and the second region B3 adjacent to the first region A3 includes second crack lines C32 formed in a second direction. The magnetic sheet 113 of FIG. 6 is similar to the magnetic sheet 111 of FIG. 4 in that the first crack lines C31 and the second crack lines C32 form the pattern in which the plurality of polygons having the center point O as concentricity are arranged, but the first region A3 and the second region B3 have shapes that are different from the shapes of the first region A1 and the second region B1, respectively, of the magnetic sheet 111 of FIG. 4.

Figure 7:
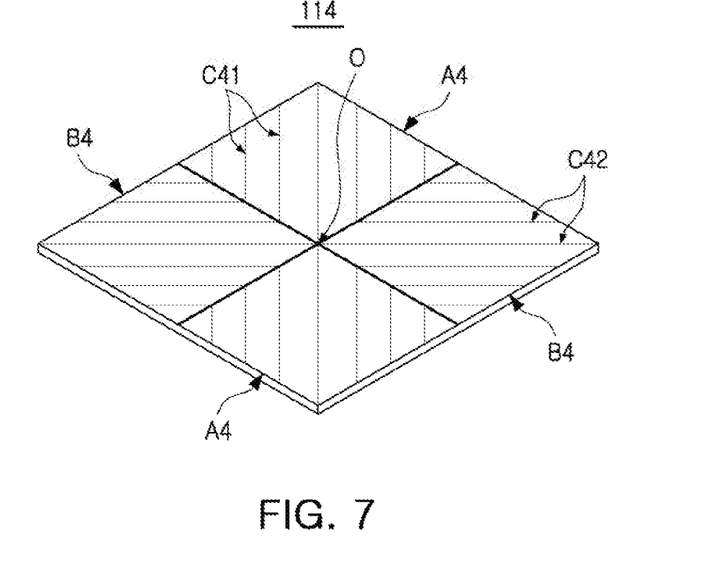

Referring to FIG. 7, the magnetic sheet 114 includes two first regions A4 and two second regions B4. The first region A4 includes first crack lines C41 formed in a first direction, and the second region B4 adjacent to the first region A4 includes second crack lines C42 formed in a second direction. The magnetic sheet 114 of FIG. 7 is similar to the magnetic sheet 112 of FIG. 5 in that the first crack lines C41 and the second crack lines C42 form the cross-shaped pattern, but the first region A4 and the second region B4 have shapes that are different from the shapes of the first region A2 and the second region B2, respectively, of the magnetic sheet 112 of FIG. 5.

Figure 8:
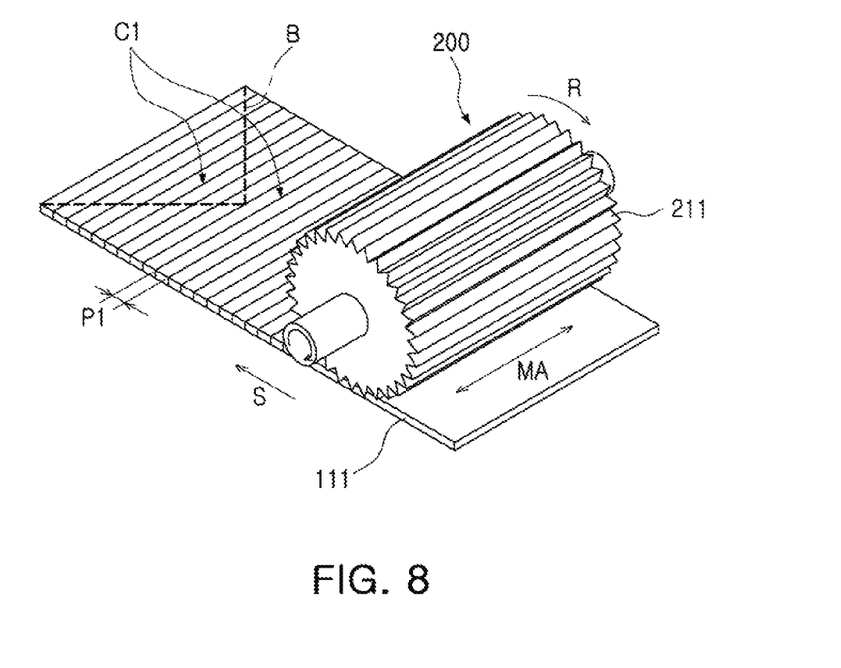
FIG. 8 is a process diagram illustrating a method for manufacturing a magnetic sheet, according to an embodiment.

FIG. 8 is a process diagram illustrating a method for manufacturing the magnetic sheet 111, according to an embodiment. It is to be understood that the method described below with respect to FIG. 8 may also be modified to manufacture the magnetic sheets 112, 113, and 114.

Referring to FIG. 8, the crack lines C1 are formed by applying a roller 200 having protrusions 211 to the magnetic sheet 111. That is, the magnetic sheet 111 is crushed or scored by the protrusions 211 in a form corresponding to the protrusions 211. Accordingly, the magnetic sheet 111 is divided by the crack lines C1 (encompassing the crack lines C11 and C12 of FIG. 4). In addition, the crack lines C1 are formed in a direction (MA) of the magnetic easy axis of the magnetic sheet 111.

Specifically, the roller 200 rotates (R) on a surface of the magnetic sheet 111, and the magnetic sheet 111 shifts (S) together with such a rotation (R) of the roller 200. For example, a direction in which the magnetic sheet 111 is shifted (S) and the crack lines C1 are perpendicular to each other. That is, the protrusions 211 of the roller 200 are formed to be perpendicular to a direction in which the roller 200 rotates and moves. However, according to another embodiment, the protrusions 211 of the roller 200 may be formed to be parallel to the direction in which the roller 200 rotates and moves.

In addition, the crack lines C1 have a uniform pitch P1, that is, a uniform interval between adjacent lines C1. Permeability of the magnetic sheet 111 is determined by the pitch P1.

According to an example, the magnetic sheet 111 is re-combined to form the first and second regions A1 and B1 after being processed (e.g., cut) along a dashed line B through a press operation. In addition, according to another embodiment, the protrusions 211 of the roller are formed to correspond to the pattern formed by the crack lines C1.

Figure 9:
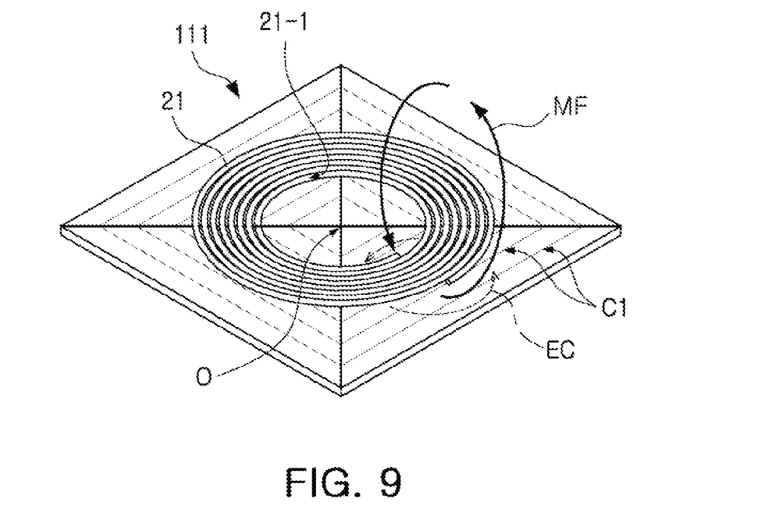
FIG. 9 is a perspective view schematically illustrating a form in which the magnetic sheet of FIG. 4 and a coil are disposed in the wireless power charging apparatus of FIG. 1, according to an embodiment.
Figure 10:
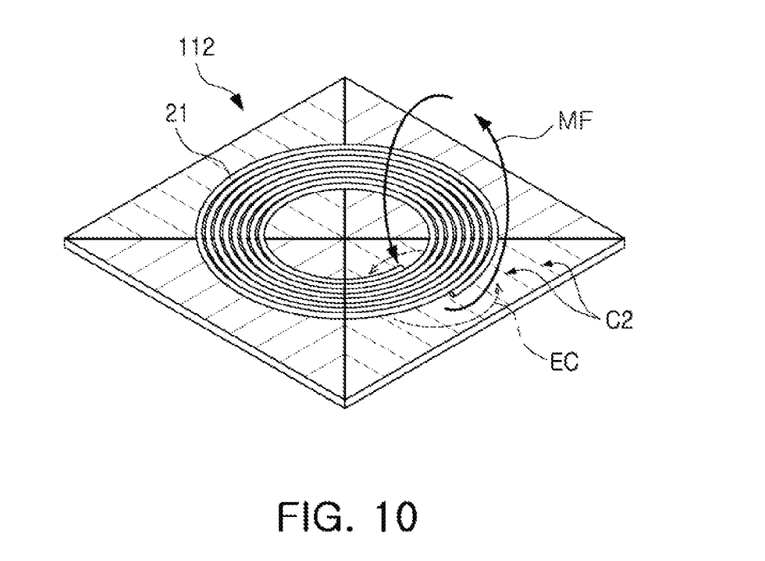
FIG. 10 is a perspective view schematically illustrating a form in which the magnetic sheet of FIG. 5 and a coil are disposed in the wireless power charging apparatus of FIG. 1, according to an embodiment.

FIG. 9 is a perspective view schematically illustrating a form in which the magnetic sheet 111 of FIG. 4 and the wireless power charging coil 21 are disposed in a wireless power charging apparatus, according to an embodiment. FIG. 10 is a perspective view schematically illustrating a form in which the magnetic sheet 112 of FIG. 5 and the wireless power charging coil 21 are disposed in the wireless power charging apparatus, according to an embodiment.

Referring to FIGS. 9 and 10, the wireless power charging apparatus includes the wireless power charging coil 21, and a shielding sheet in which the magnetic sheets 111 and 112, respectively, are stacked and disposed on one side of the coil 21. In addition, the coil 21 has a winding center disposed at a central portion of the magnetic sheet 111/112. That is, the coil 21 is disposed so that the center point O of the magnetic sheet 111 is positioned inside of an inside wiring 21-1 of the coil.

The shielding sheet is formed by stacking the magnetic sheets as described with reference to FIG. 3, but FIGS. 9 and 10 illustrate only one magnetic sheet 111/112.

For example, the direction of the crack lines C1 formed on the magnetic sheet 111 of FIG. 9 are approximately perpendicular to the direction of the magnetic field MF formed around the coil 21. In this case, the magnetic sheet 111 has magnetic characteristics such as permeability, which are adjusted by an interval between the crack lines C1. That is, the crack lines C1 determine characteristics of the magnetic sheet 111 suitable for a power amount, a transmission frequency, and coil characteristics.

In addition, the direction of the plurality of crack lines C2 (encompassing the first and second crack lines C21 and C22 in FIG. 5) formed on the magnetic sheet 112 of FIG. 10 are approximately parallel to the direction of the magnetic field MF. In this case, the magnetic sheet 112 more effectively collects the magnetic field.

That is, the crack lines C1 and C2 formed on the magnetic sheets 111 and 112, respectively, adjust magnetic characteristics such as permeability of the magnetic sheet to the magnetic field MF.

In addition, the crack lines C1 and C2 formed on the magnetic sheets 111 and 112, respectively, reduce an eddy current EC formed in the magnetic sheets 111 and 112 by the magnetic field MF.

Figure 11:
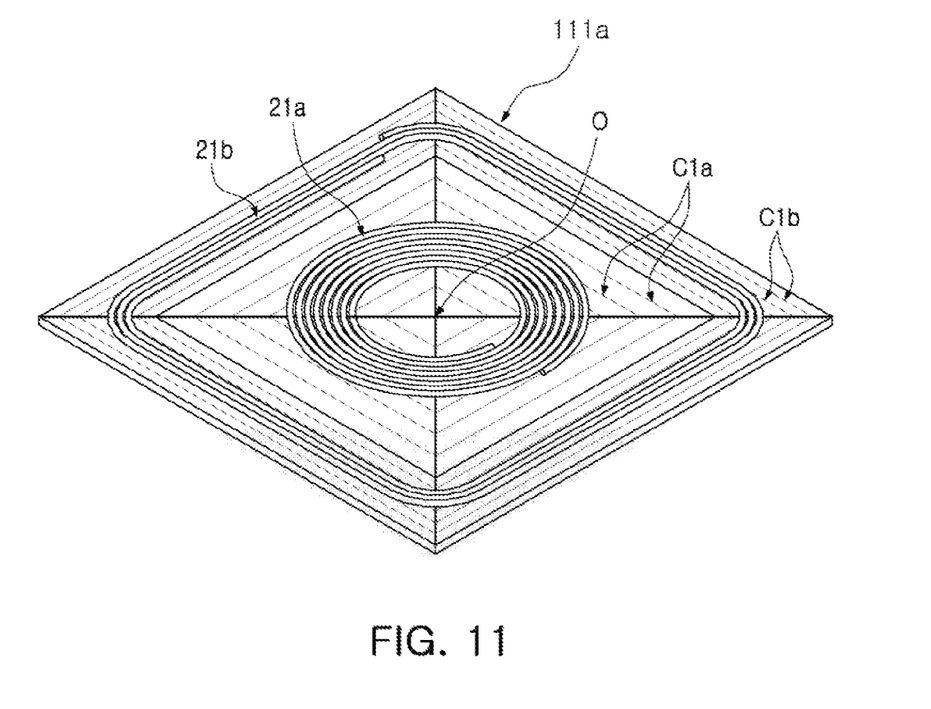
FIG. 11 is a perspective view schematically illustrating a form in which the magnetic sheet of FIG. 4 and two coils are disposed in the wireless power charging apparatus of FIG. 1, according to an embodiment.

FIG. 11 is a perspective view schematically illustrating a form in which the magnetic sheet 111a and two coils 21a and 21b are disposed in a wireless power charging apparatus, according to an embodiment.

Referring to FIG. 11, the wireless power charging apparatus includes a first coil 21a, a second coil 21b, and a magnetic sheet 111a on which crack lines C1a and C1b are formed.

The crack lines C1a and C2b form a pattern including polygons having the center point O as centricity, similarly to the crack lines C1 in the magnetic sheet 111 of FIG. 9, but the crack lines C1b formed on a region of the magnetic sheet 111a corresponding to the second coil 21b have a pitch that is different from a pitch of the crack lines C1a formed on a region of the magnetic sheet 111a corresponding to the first coil 21a.

For example, the first coil 21a and the second coil 21b are wireless power charging coils having power amounts, transmission frequencies, and coil characteristics which are different from each other, and the region of the magnetic sheet 111a corresponding to the first coil 21a and the region of the magnetic sheet 111a corresponding to the second coil 21b provide different permeabilities.

That is, in a multi-coil structure in which two or more coils are employed, the crack lines C1a and C1b reduce the eddy current in the magnetic sheet, and determine permeability of the magnetic sheet 111a suitable for the power amount, the transmission frequency, and the coil characteristics for each of the coils.

As set forth above, according to the example embodiments disclosed herein, the magnetic sheet and the wireless power charging apparatus including the same reduce the eddy current generated by the electromagnetic field, and improve the shield performance and transmission and reception efficiency of the electromagnetic field.

Further, since the magnetic sheet has permeability which may be adjusted according to the frequency of the wireless transmission signal, the magnetic sheet may be applied to various frequency bands.

Further, the wireless power charging apparatus including such a magnetic sheet may be advantageously miniaturized and thinned.

Various advantages and effects of the disclosure herein are not limited to the description above, and may be more readily understood in the description of example embodiments.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A magnetic sheet comprising:
   a first region and a second region adjacent to each other on a surface, wherein the first region comprises first crack lines extending in a first direction, and the second region comprises second crack lines extending in a second direction,
   wherein the first crack lines and the second crack lines extend to outer edges of the first region and the second region, respectively, from a boundary between the first region and the second region,
   the first crack lines and the second crack lines are perpendicular to outer edges of the first region and the second region, respectively, and
   the first crack lines and the second crack lines define a cross-shaped pattern.

2. The magnetic sheet of claim 1, wherein the first region and the second region each are provided in a same plural number and alternates around a center point of the surface.

3. The magnetic sheet of claim 1, wherein the first direction is a direction of a magnetic easy axis of the first region and the second direction is a direction of the magnetic easy axis of the second region.

4. The magnetic sheet of claim 1, wherein the first direction and the second direction are perpendicular to each other.

5. The magnetic sheet of claim 1, wherein
   the magnetic sheet includes at least two first regions including the first region and at least two second regions including the second region,
   respective ones of the at least two first regions are adjacent to corresponding ones of the at least two second regions, respectively, and
   boundaries, at which respective ones of the at least two first regions are adjacent to corresponding ones of the at least two second regions intersect with each other at a center point.

6. The magnetic sheet of claim 1, wherein the first crack lines and the second crack lines are formed from linear crushing by a roller comprising protrusions.

7. A wireless power charging apparatus comprising:
   a wireless power charging coil; and
   a shielding sheet comprising stacked magnetic sheets at a side of the coil, the magnetic sheets each including,
     a first region comprising first crack lines extending in a first direction, and
     a second region comprising second crack lines extending in a second direction,
   wherein the first region and the second region alternate with respect to a center point of a corresponding one of the magnetic sheets,
   the first crack lines and the second crack lines extend to outer edges of the first region and the second region, respectively, from a boundary between the first region and the second region,
   the first crack lines and the second crack lines are perpendicular to outer edges of the first region and the second region, respectively, and
   the first crack lines and the second crack lines define a cross-shaped pattern.

8. The wireless power charging apparatus of claim 7, wherein the first direction is a direction of a magnetic easy axis of the first region and the second direction is a direction of a magnetic easy axis of the second region.

9. The wireless power charging apparatus of claim 7, wherein the first direction and the second direction are perpendicular to each other.

10. The wireless power charging apparatus of claim 7, wherein
the magnetic sheets each includes at least two first regions including the first region and at least two second regions including the second region,
respective ones of the at least two first regions are adjacent to corresponding ones of the at least two second regions, respectively, and
boundaries, at which respective ones of the at least two first regions are adjacent to corresponding ones of the at least two second regions intersect with each other at the center point.

11. The wireless power charging apparatus of claim 7, wherein the first crack lines and the second crack lines are formed from linear crushing by a roller comprising protrusions.

12. The wireless power charging apparatus of claim 7, wherein the coil comprises a winding center at a central portion of a corresponding one of the magnetic sheets.

13. A magnetic sheet comprising:
first linear depressions on a surface of the magnetic sheet, the first linear depressions in first regions of the magnetic sheet, and the first linear depressions extending in a magnetic easy axis direction of each of the first regions; and
second linear depressions on the surface, the second linear depressions in second regions of the magnetic sheet, and the second linear depressions extending in a magnetic easy axis direction of each of the second regions,
wherein the magnetic easy axis direction of the first regions is different than the magnetic easy axis direction of the second regions,
the first linear depressions and the second linear depressions extend to outer edges of the first region and the second region, respectively, from a boundary between the first region and the second region,
the first linear depressions and the second linear depressions are perpendicular to outer edges of the first region and the second region, respectively, and
the first linear depressions and the second linear depressions define a cross-shaped pattern.

14. The magnetic sheet of claim 13, wherein the magnetic easy axis direction of the first regions is perpendicular to the magnetic easy axis direction of the second regions.

15. The magnetic sheet of claim 13, wherein each of the first regions is adjacent to a corresponding one of the second regions.

* * * * *